(No Model.)
C. W. HUNT.
CAR TRUCK.
No. 450,386. Patented Apr. 14, 1891.
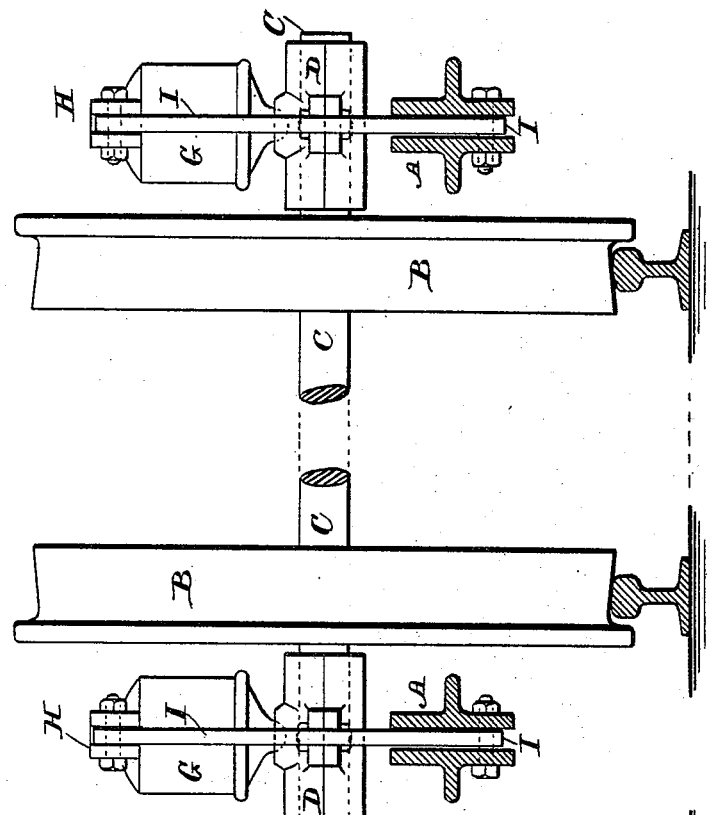
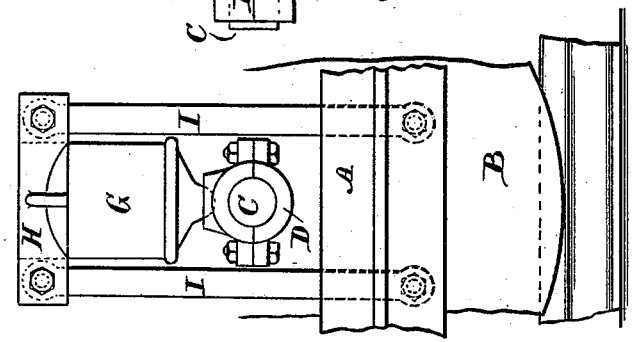
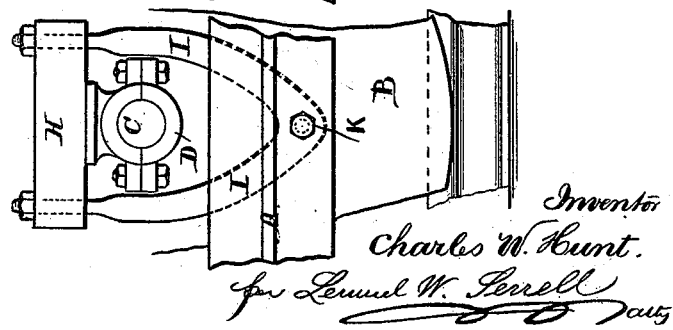
Witnesses
Chas H. Smith
J. Staib
Inventor
Charles W. Hunt.
for Lemuel W. Serrell
Atty

UNITED STATES PATENT OFFICE.

CHARLES W. HUNT, OF WEST NEW BRIGHTON, NEW YORK.

CAR-TRUCK.

SPECIFICATION forming part of Letters Patent No. 450,386, dated April 14, 1891.

Application filed February 6, 1891. Serial No. 380,457. (No model.)

*To all whom it may concern:*

Be it known that I, CHARLES W. HUNT, a citizen of the United States, residing at West New Brighton, in the county of Richmond and State of New York, have invented an Improvement in Car-Trucks, of which the following is a specification.

In Letters Patent No. 347,936, granted to me August 24, 1886, car-wheels are represented with a flange outside of the track-rails and the treads of the wheels are conical, the larger diameter being inwardly, and the car or truck frame is between the wheels and the axle-boxes and suspended by links, and a sleeve is provided between the wheels with a central kingbolt or pivot to a triangular frame.

I find that by placing the car or truck frames outside of the wheels and providing suspending devices for the axle-boxes the triangular frame can be dispensed with.

In the drawings, Figure 1 is an end elevation, and Figs. 2 and 3 are side elevations, representing the suspending device and the frame outside of the car-wheels.

The car-wheels B are upon the axle C, and such car-wheels are conical with the larger diameter of the conical tread inwardly, and the flanges of the wheel are outside of the rails.

The car-frame may be of wood or metal. I have represented it as of metal, and the axle-boxes D are upon the outer ends of the axle C and the frames A are outside of the wheels, and they are provided with suspending links I to the cross-bar H above the axle-boxes D, and springs may be introduced, as at G, or not, as desired, and there may be pairs of links I, as shown in Fig. 2, and the pairs of links may be brought together in a V form to the bolt K, as shown in Fig. 3. When the weight is suspended by the links I and the frames A are below the axle-boxes D, the weight will tend to restore the links I to a vertical position; but the links allow the parts to swing as the car is moving on a curved track, and the axle-boxes being outside the wheels B there is sufficient leverage, by the weight acting through the pendent links upon the axle-boxes and axle, to maintain the axle and wheels in their proper relation to the track, whether traveling upon a straight or upon a curved track, whereas in cases where the suspending links and frames come between the wheels there is not sufficient leverage of the weight acting through the suspending links to hold the axle and wheels in their proper relation to the frame of the truck or car. Hence the present improvements enable me to simplify the device in my aforesaid patent and render the same more reliable and effective.

I claim as my invention—

1. The combination, with the axle and car-wheels having outside flanges, of axle-boxes at the outer ends of the car-axle and outside of the wheels and connections between the boxes and frame outside the car-wheels, substantially as set forth.

2. The combination, with the axle, of car-wheels having the flanges at their outer faces, conical treads with the larger portions of the cones inwardly, car or truck frames outside of the wheels, axle-boxes on the outer ends of the axles, and links between the frame and the axle-boxes for allowing the axles to swivel, substantially as set forth.

Signed by me this 26th day of January, 1891.

CHAS. W. HUNT.

Witnesses:
GEO. T. PINCKNEY,
HAROLD SERRELL.